United States Patent [19]
McHardy et al.

[11] Patent Number: 4,766,522
[45] Date of Patent: Aug. 23, 1988

[54] ELECTROCHEMICAL CAPACITOR

[75] Inventors: John McHardy, Westlake Village; Frank A. Ludwig, Rancho Palos Verdes; Lin R. Higley, Costa Mesa; Andrew Kindler, San Marino; Carl W. Townsend, Los Angeles, all of Calif.

[73] Assignee: Hughes Aircraft Company, Los Angeles, Calif.

[21] Appl. No.: 73,673

[22] Filed: Jul. 15, 1987

[51] Int. Cl.$^4$ .............................................. H01G 9/00
[52] U.S. Cl. .............................................. 361/433
[58] Field of Search ......... 361/433 M, 433 S, 433 LC

[56] References Cited

U.S. PATENT DOCUMENTS

| | | | |
|---|---|---|---|
| 3,419,760 | 12/1968 | Raleigh | 361/433 |
| 3,555,369 | 1/1971 | Yoshino | 361/433 X |
| 4,164,005 | 8/1979 | Cheseldine | 361/272 X |
| 4,231,076 | 10/1980 | Markarian et al. | 361/272 X |
| 4,332,003 | 5/1982 | Hetrick | 361/433 |
| 4,435,742 | 3/1984 | Hetrick | 361/433 |
| 4,638,407 | 1/1987 | Lundsgaard | 361/433 |
| 4,642,876 | 2/1987 | Murray et al. | 361/433 X |

Primary Examiner—Donald A. Griffin
Attorney, Agent, or Firm—M. E. Lachman; A. W. Karambelas

[57] ABSTRACT

An electrochemical capacitor (battery-capacitor) which provides high power density and rapid charging and discharging times ranging from a few milliseconds to a few seconds. The capacitor device includes at least one electrochemical cell having two electrodes and an electrolyte therebetween. The electrodes and electrolyte are capable of rapid redox kinetics with the electrodes being spaced apart by no more than 0.002 inch ($5.08 \times 10^{-3}$ cm) to thereby provide rapid charging and discharging times.

25 Claims, 2 Drawing Sheets

ELECTROCHEMICAL CAPACITOR

This invention was made with Government support under Contract No. DAAA21-85-C-0156 awarded by the Department of the Army. The Government has certain rights in this invention.

BACKGROUND OF THE INVENTION

1. Field of the Invention

The present invention relates generally to capacitors which store electrical energy by electrochemical means as opposed to conventional capacitors which store energy electrostatically. More particularly, the present invention is directed to a new type of improved electrochemical capacitor which is capable of being charged and discharged at relatively rapid rates.

2. Description of the Background Art

Capacitors based on electrochemical (as opposed to electrostatic) energy storage promise to solve two major problems facing the development of space power systems. First, conventional capacitor materials will not withstand the 300° C. ambient temperatures expected on space platforms. Second, weight and volume constraints in space will demand capacitors with the maximum possible energy density.

The ability of electrochemical devices to perform at elevated temperatures has already been demonstrated. Examples include the sodium-sulfur battery (300°–400° C.), the molten-carbonate fuel cell (700°–800° C.) and the solid-oxide fuel cell (900°–1000° C.). Similarly, the energy density of electrochemical storage cells can exceed 1000 kJ/kg—several orders of magnitude greater than that of conventional capacitors. The one factor that has prevented widespread use of electrochemical cells in place of capacitors is their relatively low power density (long charge/discharge times).

Two electrochemical approaches have been taken towards combining the high energy density of batteries with the high power density of capacitors. The first approach has involved maximizing the energy density of electrostatic storage (the "double-layer capacitor" approach).

The very large capacitance values associated with electrochemical "double layers" (typically 10–20 uF $cm^{-2}$) arise from the small effective thickness of the "dielectric"-a monolayer of water molecules absorbed on the electrode surface. The phenomenon has been successfully incorporated in a class of energy storage devices known as double layer capacitors. An example of this type of capacitor is the Maxcap TM capacitor marketed by SOHIO Engineered Materials Co. (See SOHIO Engineered Materials Co. Brochure, "Maxcap TM Double Layer Capacitor", Form A-14,036, January, 1985.) (Also see A. Nishino, A. Yoshida, I. Tanahashi, I. Tajima, M. Yamashita, T. Muranada, and H. Yoneda, National Technical Report, 31, 318 (1985)).

In the Maxcap TM device, pairs of carbon black electrodes, separated by an electrolyte, are charged to a point just short of water electrolysis. With electrode surface areas in excess of 1000 square meters per gram ($m^2 g^{-1}$), the device offers energy densities in the range of 1 kilojoule per kilogram (kJ $kg^{-1}$), or about 0.3 watthours per kilogram (W h $kg^{-1}$). This range approaches the energy densities of conventional batteries and is half an order of magnitude greater than achievable with conventional capacitors. However, charge and discharge times are relatively long, being on the order of 10 seconds. The slow charging and discharging rates results from the "transmission line" effect of the distributed capacitances and large series resistances that are intrinsic to porous electrode systems.

A second approach relies on the electrochemical phenomenon known as "pseudocapacitance". Here, the reversible relationship between charge and voltage arises from the kinetically rapid oxidation and reduction of species that are chemically bound to the electrode surface. Capacitors based on the pseudocapacitance phenomenon are disclosed in European Patent Application No. 82109061.0 (Publication No. 0078404) which was filed on Sept. 30, 1982.

The pseudocapacitance type capacitors disclosed in the European Patent Application No. 82109061.0 are designed to provide a high degree of kinetic and/or coulombic reversibility. The disclosed capacitors include electrodes made of materials such as ruthenium oxides and mixtures of ruthenium with tantalum and/or iridium which are spaced 0.010 inch (10 mil.) and 0.015 inch (15 mil.) apart. A wide variety of electrolytes are suggested for use. Although these pseudocapacitance type capacitors may be well suited for their intended purposes, they are not suitable for use in systems, such as rail guns, which require rapid pulse power at intervals ranging from a few milliseconds to a few seconds.

Accordingly, there is presently a need for electrochemical capacitors which are compact, lightweight and capable of being charged and discharged during periods ranging from a few milliseconds to a few seconds.

SUMMARY OF THE INVENTION

In accordance with the present invention, electrochemical capacitors are provided which are capable of providing pulsed power at intervals ranging from a few milliseconds up to a few seconds.

The invention is based on the discovery that electrodes which support kinetically fast redox reactions can be rapidly charged and discharged when they are paired with a suitable electrolyte and when they are moved to within about 0.002 inch ($5.08 \times 10^{-3}$ cm) or less of each other. Electrodes when spaced at distances of around 0.007 inch ($1.78 \times 10^{-2}$ cm) do not provide rapid charging and discharging rates. A key feature of the present invention was the surprising discovery that the electrodes could be moved to within about 0.002 inch of each other to provide rapid charging and discharging rates without causing electrode short circuits or other undesirable effects due to the close proximity of the electrodes.

The electrochemical capacitor devices in accordance with the present invention are adapted to provide charging and discharging times ranging from a few milliseconds to a few seconds. The capacitor devices include at least one electrochemical cell having two electrodes and an electrolyte therebetween. The electrodes and electrolyte are capable of rapid redox kinetics and they are spaced apart by no more than about 0.002 inch. The combination of rapid redox kinetics and extremely small electrode spacing provides the desired rapid charging and discharging times.

As a feature of the present invention, solid electrolytes may be utilized which also function as a solid spacer between the electrodes. Alternatively, inert porous spacers may be utilized in combination with liquid electrolytes. As an additional feature, the spacers are provided with gas release channels to provide efficient removal of any gases generated between the electrodes during operation of the capacitor device.

The above-discussed and many other features and attendant advantages of the present invention will become better understood by reference to the following description of the preferred embodiments when taken in conjunction with the drawings.

DESCRIPTION OF THE PREFERRED EMBODIMENTS

The electrochemical capacitors (battery-capacitor) in accordance with the present invention are designed to provide the power and energy density levels required for pulsed power sources such as space based kinetic energy weapons, i.e., rail guns, coaxial electromagnetic launchers, etc. These systems typically require energy density on the level of at least 10 watt/hours per kilogram (W-H $kg^{-1}$) and discharge times ranging from a few milliseconds to a few seconds.

The need for rapid transfer rates makes the use of conventional battery electrode reactions unsuitable. These reactions are based upon dissolved or gaseous redox species which slow down the charge transfer rates due to mass transfer limitations. Accordingly, the present invention utilizes solid state, surface reactants having rapid redox kinetics. Exemplary redox reactions are those of platinum and iridium oxide. Although other redox reactions are possible, the following description will be limited to a discussion of the surface redox reactions of platinum and iridium oxide.

The redox reactions of platinum and iridium oxide are of the type:

$$Pt + H^+ + e^- \rightleftharpoons PtH \qquad (i)$$

$$Pt + H_2O \rightleftharpoons PtO + 3H^+ + 2e^- \qquad (ii)$$

$$IrO(OH) \rightleftharpoons IrO_2 + H^+ + e^- \qquad (iii)$$

Figure 1:
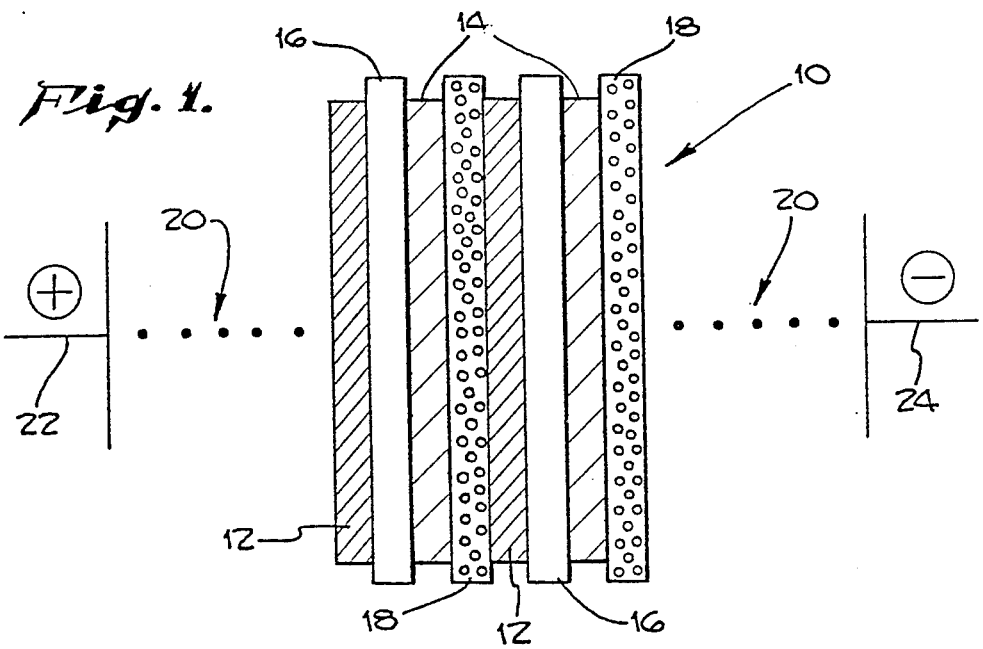
FIG. 1 is a schematic representation of a multicell electrochemical capacitor device in accordance with the present invention.

An exemplary multi-celled electrochemical capacitor in accordance with the present invention is shown schematically in FIG. 1 at 10. The battery capacitor 10 basically includes alternating anodic electrodes 12 and cathodic electrodes 14. The alternating electrodes 12 and 14 are separated by electronic conductor layers 16 and separator/electrolyte layers 18. The dots 20 are included to indicate that the sequence of electrodes, electronic conductor and separator/electrolyte which is shown in the figure can be repeated numerous times to provide battery-capacitors having the desired voltage and power densities. The number of cells which are stacked in such an arrangement may vary widely with the number of cells ranging up into the hundreds. The positive and negative terminals for the battery-capacitor are shown at 22 and 24, respectively. These terminals for the battery-capacitor 10 are conventional in nature and include conventional electrical connections necessary to connect the battery-capacitor 10 into the desired electrical circuit.

The electronic conductor 16 may be any of the conventional electronic conductor films which also function as an ion barrier. Suitable electronic conductor films include titanium, tantalum and platinum foils having thicknesses ranging from 0.00001 to 0.001 inch ($2.54 \times 10^{-5}$ to $2.54 \times 10^{-3}$ cm).

The separator/electrolyte 18 can be either a solid type electrolyte or a liquid electrolyte. The preferred solid electrolyte is the solid polymer electrolyte (SPE) Nafion ®. Nafion ® is a DuPont fluoropolymer containing cation-permeable channels of sulfonate groups. The channels in the commercially available Nafion ® are occupied by solvated hydrogen ions, but these can readily be exchanged with other cations. Commercially available Nafion ® is available as 0.007 inch ($1.78 \times 10_{-2}$ cm) thick membranes. However, the 0.007 inch thick membranes were found to give relatively poor charge storage characteristics. However, when the 0.007 inch thick commercial Nafion ® membrane was replaced with 0.001 inch thick Nafion ®, the discharge increased to as large as 50 mC $cm_{-2}$ during a discharge period of 100 milliseconds (mS). Accordingly, for solid electrolytes, the electrodes in accordance with the present invention should not be spaced apart more than 0.001 inch ($2.54 \times 10^{-3}$ cm). Electrodes which are spaced further apart than 0.001 inch do not provide the necessary rapid charging and discharging rates which are provided by electrodes spaced below 0.001 inch. Preferably, the electrodes are placed as close together as possible. However, the electrodes must be spaced sufficiently apart to prevent electrical shorting between the plates or other undesirable electrical phenomenon. When using solid electrolytes, such as Nafion ®, it is preferred that the electrode be deposited as a thin layer directly onto the solid polymer electrolyte.

Liquid electrolytes are also suitable. Strong acid electrolytes such as sulfuric acid, perchloric acid and perfluoromethanesulfonic acid are preferred. The higher conductivity of these acids compared with Nafion ® allows the use of somewhat greater electrode separation. When utilizing liquid electrolytes, a porous separator material which is 0.002 inch thick or less must be utilized. Suitable porous layer materials include microporous polypropylene which is rendered hydrophilic by a surfactant treatment. Suitable commercial microporous polypropylene includes Celgard ® 3501 supplied by Celanese Corporation (Summit, NJ). Other porous separator materials may be utilized provided that they can be formed into separator sheets of 0.002 inch or less thickness while still providing the desired porous hydrophilic layer to allow transfer of ions between the electrodes. Polypyrrole may also be used if desired to replace the metallic components of the cell (i.e. the electrode materials, electron conductor plates or current collectors). Other similar polymeric electronconductors may also be used. Optionally, when using a liquid electrolyte, the electrodes may be pretreated to provide dopant ions to enhance the charge storage capacity of the device. For example, the electrode may be treated with chloride ions from HCl or a chloride salt, or with other halide ions and subsequently used in a cell containing sulfuric acid as the electrolyte.

Figure 2:
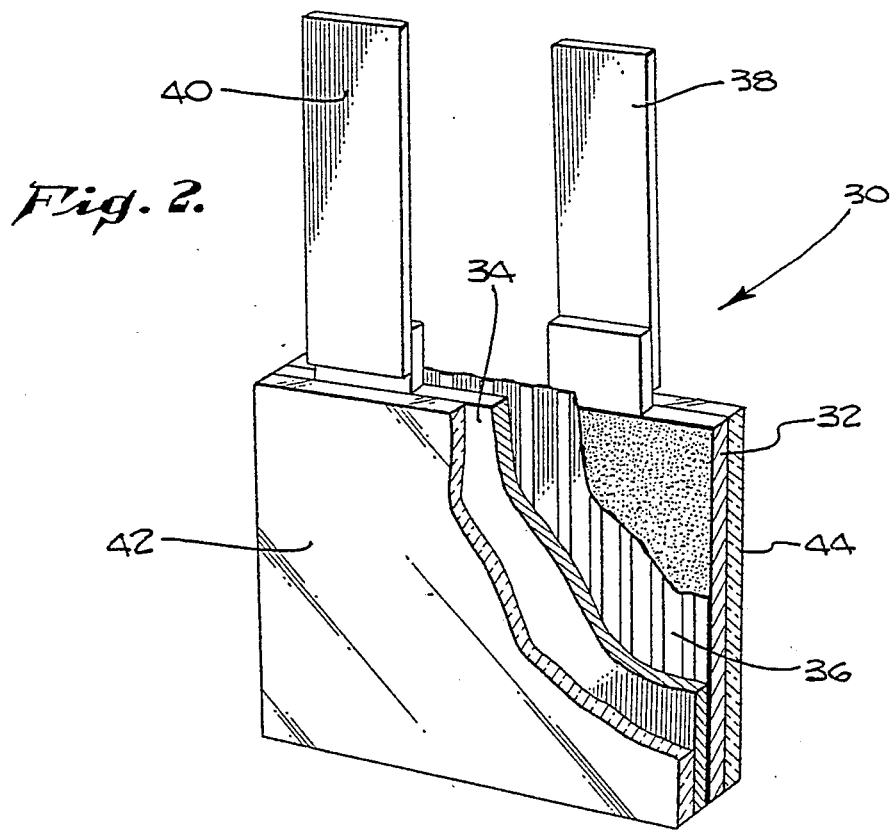
FIG. 2 is a perspective view of a preferred exemplary single cell embodiment which is partially sectioned to how a preferred spacer or separator design that provides gas release from between the electrodes.

An exemplary single cell device in accordance with the present invention is shown generally at 30 in FIG. 2. The single cell device 30 includes electrodes 32 and 34 which are separated by spacer plate 36. Current collectors 38 and 40 are attached to electrodes 32 and 34 respectively to allow charging and discharging of the device. Glass plates 42 and 44 are provided to sandwich the electrodes 32 and 34 together against the spacer plate 36. Any other suitable non-conducting plates may be substituted for the glass provided that they may be clamped together to provide the desired positioning of the electrodes 32 and 34 with respect to spacer plate 36.

Figure 3:
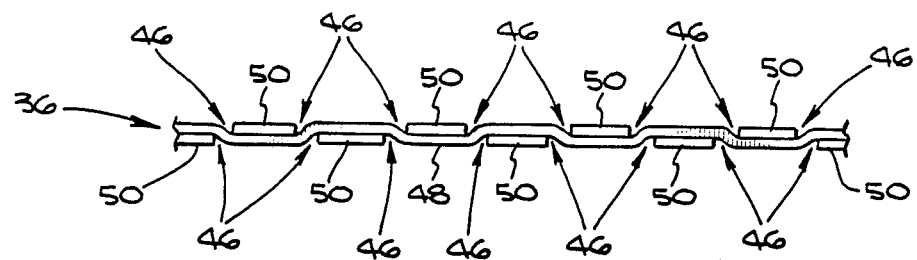
FIG. 3 is a detailed sectional view of the gas-releasing separator shown in FIG. 2.

A detailed top partial sectional view of the separator plate 36 is shown in FIG. 3. This separator plate design is preferred because it provides channels 46 which allow any gas formed during operation of the device to escape vertically from between the electrodes 32 and 34. Other possible separator plate designs are possible so long as continuous vertical channels are provided to allow escape of gases from the cell. The preferred separator 36 includes a single plate 48 which is contoured between alternating vertical strips 50. Preferably, the plate 48 and strips 50 are made from the same spacer material and have the same thickness.

Figure 4:
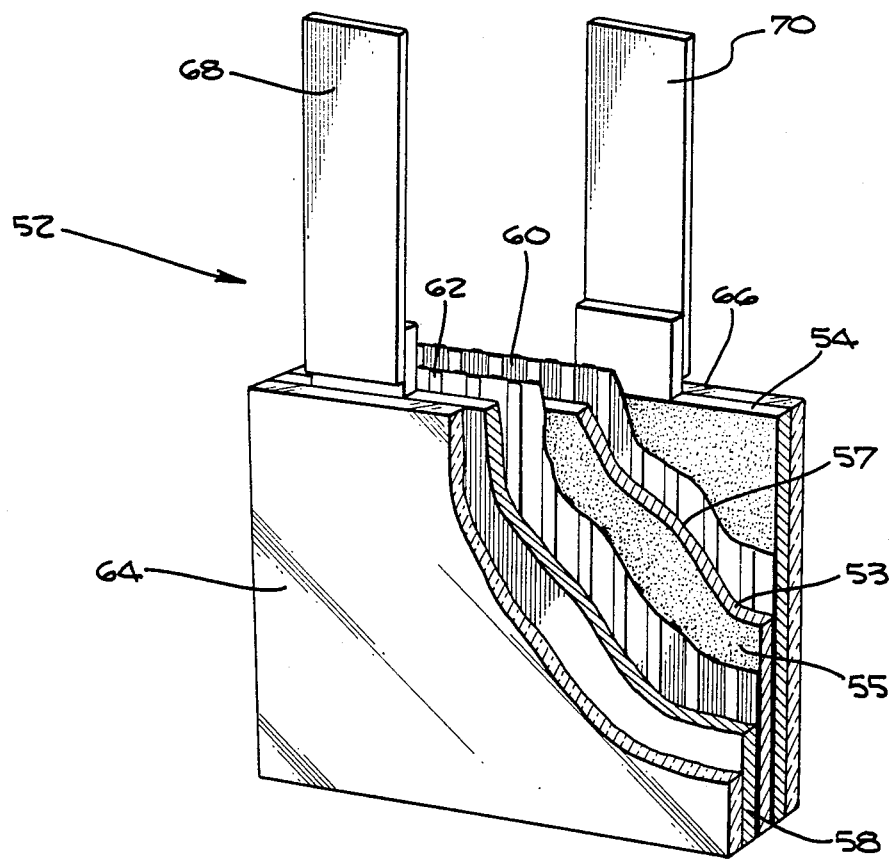
FIG. 4 is an exemplary double cell device in accordance with the present invention utilizing bi-polar electrodes made by platinizing one side of commercial (DSA) $IrO_2$ electrodes.

A second exemplary device in accordance with the present invention is shown generally at 52 in FIG. 4. The exemplary capacitor 52 is a dual cell device which includes electrodes 54, 56 and 58. Spacer layers 60 and 62 are included to provide the necessary 0.002 inch or less spacing between electrodes 54, 56 and 58. The 15 electrode assembly is sandwiched between glass plates 64 and 66 with current collectors 68 and 70 being provided to connect the device to external electrical circuits.

The central electrode 56 is a bipolar electrode which includes a central electron conducting layer 53 onto which the electrode layers 55 and 57 are coated. The central layer 53 may be any electron conducting material such as titanium foil. As will be described below, suitable bipolar electrodes can be made by coating commercially available iridium oxide electrodes 25 on one side with platinum. Alternatively, a bipolar stack of cells can be assembled from sheets of Nafion ® or other suitable solid polymer electrolyte that are plated on both sides with platinum. In addition, hybrid bipolar stacks can be prepared from cells in which the Nafion ® is cast onto an iridium oxide electrode followed by plating of platinum onto the opposite side of the solid polymer electrolyte.

Although the exemplary devices in FIGS. 2 and 4 are only single cell and double cell devices, it should be pointed out that these devices are shown for exemplary purposes only and that multi-cell devices comprising up to a hundred or more cells are contemplated in accordance with the present invention in order to provide useful voltages and power densities.

Examples of practice are as follows. Single and dual cell devices were prepared utilizing the solid electrolyte Nafion ® and platinum electrode layers. The platinum electrodes were applied directly to the Nafion ® membranes by a series of alternate immersions in hydrazine hydrate and 2 percent chloroplatinic acid at room temperature. The immersion sequence was: (1) chloroplatinic acid (2 minutes); (2) hydrazine hydrate (10 minutes); and (3) water rinse. This three-step immersion cycle was repeated up to twenty times. Best results were obtained when the Nafion ® membrane first received a palladium activation treatment, similar to that employed for electroless plating on polymer surfaces, to deposit a layer of palladium particles on the surface of the Nafion ®. The palladium particles then act as nuclei for the subsequent deposition of platinum, providing a more uniform distribution of platinum and correspondingly improved performance.

When used, the surface activation was performed using Cataposit 44 followed by Accelerator 19, both supplied by Shipley Corporation (Newton, MA). The activation immersion sequence was: (1) water (5 minutes); (2) Cataposit 45 (4.5 minutes); (3) water (2 minutes); (4) Accelerator 19 (4.5 minutes); and (5) water (2 minutes). Test cells were made from both commercial 0.007 inch Nafion ® film (DuPont, Wilmington, Delaware) and experimental 0.001 inch (25-micron) Nafion ® membranes supplied by Solution Technology Inc. (Mendenhall, Pennsylvania). The test cells utilizing 0.007 inch thick membranes gave relatively poor charge storage (i.e. unmeasurably small) while the 0.001 inch thick membrane cells produced charges of up to 50 mC cm$^{-2}$ which were released over a period of about 100 milliseconds. Peak currents as high as 1.9 A cm$^{-2}$ were obtained from these cells. Further, charge retentions of 70 percent were found even after a one minute delay. In addition, it was found that the charge retention and power density for the cells were increased in relation to the number of cyclic treatments with chloroplatinic acid and hydrazine.

Sulfuric acid electrolyte cells as shown in FIG. 2 were made utilizing iridium oxide electrodes. These electrodes were made by first boiling titanium foil in 10 percent oxalic acid to etch and clean the surface followed by dipping in a solution of about 4 percent by weight iridium chloride, $IrCl_3$, in a mixture of three parts isopropanol and one part concentrated hydrochloric acid. After dipping, the electrodes were dried with a heat gun and fired at 317° C. to thermally decompose the iridium chloride and deposit iridium oxide on the titanium foil. The dipping and firing process was sometimes repeated to build up thicker coats having thicknesses in a range estimated between 0.00001 and 0.0001 inch ($2.54 \times 10^{-5}$ to $2.54 \times 10^{-4}$ cm). The thickness of the titanium foil was about 0.004 inch (0.01 cm).

Commercially available iridium oxide electrodes were also used for some of the cells. These electrodes were supplied by Electrode Corporation, a subsidiary of Eltech Systems Corporation (Chardon, Ohio). The electrodes were type TIR-2000 DSA (dimensionally stable anode) normally used for oxygen evolution. These commercial electrodes also use titanium foil as the substrate upon which the iridium oxide is deposited, but unlike the electrodes described above, they also contain admixtures of tantalum oxide in proprietary amounts. Some of the commercial electrodes were found to accept a charge only as anodes.

Sulfuric acid electrolyte cells including platinized electrodes were also made. These electrodes were prepared by cathodic deposition of platinum black on either platinum or iridium oxide electrodes. The platinum black was deposited from an electrolyte containing: 4 weight percent chloroplatinic acid, $H_2PtCl_6$, and 0.02 weight percent lead acetate, $(CH_3COO)_2Pb$, in 0.1 M hydrochloric acid. The anode of the deposition cell was an iridium oxide electrode. Deposition of the platinum black on platinum substrates (5 cm$^2$ in area) was performed at 0.1 amps for 15 seconds, followed by 1.0 amps for either 30 or 60 seconds. Deposition of the platinum black on iridium oxide substrates (also 5 cm$^2$ in area)

was performed at 0.05 amps for 15 seconds, followed by 0.5 amps for 30 seconds.

The electrolyte used with the above described exemplary iridium oxide electrodes and platinized electrodes was either 1 M or 3.6 M sulfuric acid. The sulfuric acid electrolyte was impregnated into separator membranes made from Celgard ® which was rendered hydrophilic by a surfactant treatment. In addition, a sulfuric acid cell of the type just described was made and the electrodes were pretreated with halide ions to enhance the charge storage capacity of the cell. The electrodes were operated in a cell containing HCl and subsequently operated in the cell containing $H_2SO_4$. The charge storage capacity of the cell using these pretreated electrodes in 3.6M $H_2SO_4$ was 40.3 mC cm$^{-2}$. The charge storage capacity of the same cell using untreated electrodes was 24.75 mC cm$^{-2}$. These results represent an improvement of over 60 percent using the pretreated electrodes. It was also observed that the self discharge rates were greater in the presence of chloride ions. However, this drawback may not be significant in applications where rapid charge and discharge cycles are employed. Optionally, the pretreatment may be accomplished by immersing the electrode in the ionic solution without actually operating the cell.

Sulfuric acid electrolyte cells having iridium oxide electrodes as prepared above were found to provide capacitance values of several mF cm$^{-2}$ with charging and discharging times in the domain of milliseconds. A cell having platinized platinum electrodes as set forth above was assembled into the configuration similar to that shown in FIG. 2 except that spacers were used to achieve about a 0.1 inch (about 3 mm) separation between the electrodes. In addition, a 25-micron thick layer of Celgard was used as the separator. The assembly was charged to 1.55 volts using 1 M sulfuric acid as the electrolyte. When discharged immediately, the cell released 41.2 mC cm$^{-2}$ in 175 milliseconds. Self-discharge was examined by disconnecting the cell from the charging circuit and allowing it to stand for a period of time before discharge. After five minutes, the store charge had diminished by only 33 percent. A second cell using electrodes that were platinized for 15 seconds at 0.1 amps and 30 seconds at 1.0 amps (instead of 60 seconds at 1.0 amps) yielded only 20 mC cm$^{-2}$ upon immediate discharge. This indicates the desirability of maximizing the surface area of the electrode.

The above example was repeated in which the space between the platinized electrodes was decreased to 50 microns. The charge storage was reduced to only 5.5 mC cm$^{-2}$ and all of this charge was lost within one minute of standing. This result shows that cells with two closely spaced platinum electrodes suffer from relatively rapid self discharge.

A hybrid cell of the type shown in FIG. 2 was made utilizing a platinum electrode that was platinized for 15 seconds at 0.1 amps and 60 seconds at 1 amps in combination with the commercially available iridium oxide electrode. The cell had a geometric crosssectional area of 4 cm$^2$ with the electrodes being separated by a single 25-micron thick layer of Celgard ® 3501 with the electrolyte being 1 M sulfuric acid. The times for charging and discharging the cell were in the millisecond range with charge storage being good when the platinum electrode was charged cathodically, but poor when the polarity was reversed.

Another platinum-iridium oxide hybrid cell was prepared utilizing a commercial DSA electrode as the iridium oxide electrode with the platinum electrode being prepared by platinizing one side of a DSA iridium oxide electrode. Platinization of the DSA electrode was performed on a 5 cm$^2$ substrate at 0.05 amps for 15 seconds and 0.5 amps for 30 seconds. A cell was assembled with these two electrodes having a single 25-micron layer of Celgard as the separator. The cell was charged to 1.65 volts utilizing a 3.6 M sulfuric acid electrolyte. The charge and discharge rates for the cell were in the millisecond range with 90 percent of a 25 mC cm$^2$ charge being retained for five minutes. The use of the DSA iridium oxide electrode which is platinized on one side allows assembly of multi-cell devices such as that shown in FIG. 4 wherein the hybrid platinum-iridium oxide electrode is used as the bipolar electrode 56.

A hybrid cell identical to the cell discussed immediately above was assembled utilizing a separator with the construction shown in FIG. 3. The separator was made using a single piece of 25-micron Celgard ® having narrow strips of the same material at spaced locations along opposite sides of the main Celgard sheet in the manner as shown in FIG. 3. The device could be charged to 20 mC cm$^{-2}$ in 10 milliseconds with almost 70 percent of this charge being retained after one minute.

Cells were made in which iridium oxide electrodes were used for both the anode and cathode with a single 25-micron layer of Celgard being used as the separator. When 3.6 H sulfuric acid was used as the electrolyte, this all-iridium oxide cell released 14 mC cm$^2$ in 10 milliseconds.

A solid polymer electrolyte cell was made utilizing iridium oxide and platinum as the electrodes. The electrodes were prepared by casting a film of Nafion ® from solution. Using an eye dropper, a few drops of the Nafion ® solution (EW 1100, 5 weight percent solution) were smeared onto the surface of an iridium oxide DSA electrode and allowed to air dry over night. The electrode was heated at 78°-80° C. for 30 minutes to effect curing, cooled and weighed. The process was repeated until the weight gain corresponded to a film thickness of about 15 microns. The thickness was estimated on the basis of the measured density of the nominal 0.001 inch thick film supplied by Solution Technology Inc. Treatment with water did not loosen the film from the iridium oxide electrode surface. To complete the cell, a layer of platinum was deposited on the outer surface of the Nafion ® by the hydrazine method discussed previously. A charge approaching 10 mC cm$^{-2}$ was released over 100 milliseconds using a high resistance test circuit. Care must be taken during the heat treatment step to prevent extensive cracking of the Nafion ® film during application to the iridium oxide electrode.

When preparing solid polymer electrolyte cells, platinization of Nafion ® membranes to provide electrode layers on either side of the membrane can be accomplished by pressing the Nafion ® membrane or casting the membrane against an electrode and immersing the electrode in a solution containing dissolved platinum. Current is then passed in a direction such that the electrode acts as a cathode. Platinum migrates through the Nafion ® membrane and deposits first on the electrode and then onto the membrane. After sufficient platinum has been deposited, the membrane is separated from the electrode. The second side of the membrane can then be pressed against the cathode and the process repeated in order to apply a platinum layer to both sides of the membrane.

The operation and efficiency of the above-described cells are temperature dependent. The charging and discharging times decrease as the operating temperature increases. It is preferred to operate the cells at as high a temperature as possible without causing excessively high rates of automatic discharge. Cells have been tested within the range of 0° C. to 60° C. and it is anticipated that cells can readily operate within the range of 0° C. to 300° C. or higher. Materials and structures employed in the practice of the present invention as described herein were chosen primarily in the interest of demonstrating the feasibility of electrochemical capacitors with high power densities and short charge/discharge times. The goal of achieving high temperature operation was not specifically addressed. However, it will be apparent to one skilled in the art that this goal can readily be achieved by substituting high temperature materials for those described herein. Such materials include those employed in the sodium-sulfur battery, the molten carbonate fuel cell, and the solid oxide fuel cell.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein, but is only limited by the following claims.

What is claimed is:

1. An electrochemical capacitor device adapted to provide rapid charging and discharging times ranging from a few milliseconds to a few seconds, said capacitor device comprising at least one electrochemical cell comprising two electrodes having opposed non-insulated surfaces and an electrolyte therebetween, wherein said electrodes and electrolyte are capable of rapid redox kinetics and wherein said electrodes are spaced apart by no more than about 0.002 inch ($5.08 \times 10^{-3}$ cm) to there-by provide charging and discharging times ranging from a few milliseconds to a few seconds.

2. An electrochemical capacitor according to claim 1 wherein said electrodes are platinum or iridium oxide.

3. An electrochemical capacitor according to claim 2 wherein both electrodes are platinum.

4. An electrochemical capacitor according to claim 2 wherein one electrode is platinum and the other is iridium oxide.

5. An electrochemical capacitor according to claim 2 wherein both electrodes are iridium oxide.

6. An electrochemical capacitor according to claim 1 wherein said electrodes are platinized and are formed by the electrolytic deposition of platinum onto said electrode from a solution comprising chloroplatinic acid and lead acetate in 1 molar hydrochloric acid.

7. An electrochemical capacitor according to claim 1 wherein at least one of said electrodes comprises iridium oxide and is formed by:
   (a) providing a titanium foil;
   (b) boiling said titanium foil in 10 percent oxalic acid to etch and clean the surface of said foil and provide a cleaned foil;
   (c) dipping said cleaned foil in a solution comprising about 4 percent by weight iridium chloride in a mixture comprising three parts isopropanol and one part concentrated hydrochloric acid to provide a treated electrode;
   (d) drying said treated electrode;
   (e) heating said treated electrode at about 317° C. to thermally decompose said iridium chloride and deposit said iridium oxide on said titanium foil.

8. An electrochemical capacitor according to claim 7 wherein said dipping, drying, and heating are repeated one or more times to increase the thickness of the layer of said iridium oxide.

9. An electrochemical capacitor according to claim 1 wherein said electrolyte is a solid electrolyte.

10. An electrochemical capacitor according to claim 9 wherein said solid electrolyte is formed on the surface of said electrode by:
    (a) providing said solid electrolyte material;
    (b) dissolving said solid electrolyte material;
    (c) coating said surface of said electrode with said dissolved solid electrolyte material to form a coated electrode;
    (d) heating said coated electrode to cure said solid electrolyte material and form said solid electrolyte as a layer on said surface of said electrode.

11. An electrochemical capacitor according to claim 9 wherein said solid electrolyte is an ion conducting fluoropolymer.

12. An electrochemical capacitor according to claim 9 wherein at least one of said electrodes comprises platinum and is formed directly on the surface of said solid electrolyte.

13. An electrochemical capacitor according to claim 12 wherein said electrode is formed by subjecting a body of said solid electrolyte to a first immersion in chloroplatinic acid and subsequently to a second immersion in hydrazine hydrate and repeating the cycle of said first and second immersions for up to 20 cycles to thereby form said platinum electrode directly on said surface of said solid electrolyte body.

14. An electrochemical capacitor according to claim 13 wherein prior to the first cycle of said first and second immersions said solid electrolyte body is subjected to a palladium activation treatment to deposit a layer of palladium particles on the surface of said solid electrolyte body to thereby enhance the subsequent deposition of said platinum.

15. An electrochemical capacitor according to claim 1 wherein said electrolyte is a liquid and an inert porous spacer is provided between said electrodes.

16. An electrochemical capacitor according to claim 15 wherein said electrodes are pretreated with an ionic solution to enhance the charge storage capacity of said capacitor.

17. An electrochemical capacitor according to claim 15 wherein said electrolyte is sulfuric acid.

18. An electrochemical capacitor according to claim 17 wherein said electrodes are pretreated with chloride ions.

19. An electrochemical capacitor according to claim 15 wherein said inert porous spacer is porous polypropylene.

20. An electrochemical capacitor according to claim 1 comprising a plurality of said electrochemical cells.

21. An electrochemical capacitor according to claim 20 including bipolar electrodes comprising a solid conduction layer sandwiched between two electrode layers.

22. An electrochemical capacitor according to claim 21 wherein said electrode layers are platinum and iridium oxide.

23. An electrochemical capacitor according to claim 1 wherein means are provided for conducting gas out from between the electrodes.

24. A method for providing rapid pulses of power comprising the steps of charging and discharging an electrochemical capacitor according to claim 1.

25. A method according to claim 24 wherein said electrochemical capacitor is operated at a temperature of between about 0° C. and 60° C.

* * * * *